No. 708,459. Patented Sept. 2, 1902.
E. W. BRYANT.
BOX WRAPPING MACHINE.
(Application filed Apr. 19, 1900.)
(No Model.) 10 Sheets—Sheet 1.

Fig. 1.

Witnesses:
Inventor:
Edward W. Bryant
by Clarkson A. Collins
atty

No. 708,459. Patented Sept. 2, 1902.
E. W. BRYANT.
BOX WRAPPING MACHINE.
(Application filed Apr. 19, 1900.)
(No Model.) 10 Sheets—Sheet 2.

Fig. 2.

Witnesses:
C. W. Benjamin
S. F. Randall

Inventor,
Edward W. Bryant
by
Clarkson A. Collins
atty

No. 708,459. Patented Sept. 2, 1902.
E. W. BRYANT.
BOX WRAPPING MACHINE.
(Application filed Apr. 19, 1900.)
(No Model.) 10 Sheets—Sheet 5.

Fig. 5.

Witnesses:
C. W. Benjamin
Sands F. Randall

Inventor,
Edward W. Bryant
by
Clarkson A. Collins
atty

No. 708,459. Patented Sept. 2, 1902.
E. W. BRYANT.
BOX WRAPPING MACHINE.
(Application filed Apr. 19, 1900.)
(No Model.) 10 Sheets—Sheet 8.

Attest
O. W. Benjamin
S. F. Randall

Inventor
Edward W. Bryant
by Clarkson A. Collins
atty

THE NORRIS PETERS CO., PHOTO-LITHO., WASHINGTON, D. C.

No. 708,459. Patented Sept. 2, 1902.
E. W. BRYANT.
BOX WRAPPING MACHINE.
(Application filed Apr. 19, 1900.)

(No Model.) 10 Sheets—Sheet 10.

Witnesses,
Inventor,
Edward W. Bryant
by Clarkson A. Collins
Atty

UNITED STATES PATENT OFFICE.

EDWARD W. BRYANT, OF NEW YORK, N. Y., ASSIGNOR OF ONE-HALF TO JOHN J. CORELL, OF NEW YORK, N. Y.

BOX-WRAPPING MACHINE.

SPECIFICATION forming part of Letters Patent No. 708,459, dated September 2, 1902.

Application filed April 19, 1900. Serial No. 13,431. (No model.)

*To all whom it may concern:*

Be it known that I, EDWARD W. BRYANT, a citizen of the United States, residing in the city of New York, in the county and State of New York, have invented certain new and useful Improvements in Box-Wrapping Machines, of which the following is a specification.

My invention relates to devices for inclosing rectangular boxes in a paper wrapper or envelop; and the object of my improvements is to provide a practically-operative device of this character by means of which such boxes may be completely inclosed in a sealed wrapping of paper or other similar material.

My invention involves a box-feed plane with suitable mechanism for carrying the boxes into the machine, a box-delivery plane with suitable mechanism for carrying the boxes out of the machine, a paper-feed plane intermediate between these with suitable mechanism for delivering the paper wrappers in position thereon, a vertically-reciprocating plunger for transferring the boxes from the feed-plane to the delivery-plane, a horizontally-reciprocating plunger working alternately with the vertical plunger for starting the boxes from the position in which they are delivered by the vertical plunger along the delivery-plane, and suitable mechanism operated by or in conjunction with these several parts for folding and securing the wrapper about the box.

A machine embodying my invention is illustrated in the accompanying drawings, forming a part hereof, in which the same figures of reference indicate corresponding parts throughout.

Referring to the drawings, 1 indicates the main shaft of the machine, which is actuated in any usual or suitable manner.

The mechanism for moving the boxes to be wrapped along the feed-plane into the machine is as follows: A belt from a wheel on main shaft 1 passes around a belt-wheel 2, whereby are actuated the gear-wheels 3 3 and 4 4 and the notched wheels 5 5 on the same shaft as wheels 4, around which pass the feed-chains 6 6. The wheels 3 3, 4 4, and 5 5 are mounted in pairs on their shafts, as will be readily understood, though but one of each pair is shown in the drawings. By means of cross-bars 206, connecting the chains 6 6 at equal intervals, the boxes to be wrapped are pushed along the feed-table 8 into the machine. At its extreme point of inward delivery the chain 6 6 pushes the box out upon the supports 115 115, which span the well under the plunger 28 on a level with the feed-table 8. These supports are pivoted in the sides of the plunger-well and are normally upheld by springs 116 116, so as to sustain the box, but give way and permit the box to pass when it is pushed downward by the plunger 28. The mechanism for carrying the boxes out of the machine along the delivery or discharge plane or table 13, which lies underneath the feed plane or table 8, consists of delivery-chains 11 11, mounted on notched wheels 10 10 12 12 and carrying pawls 211, and the means for actuating these, consisting of a belt wheel or pulley on the main shaft 1, from which a belt passes around a pulley 9 on the same shaft with which are mounted the notched wheels 10 10.

Figure 5:
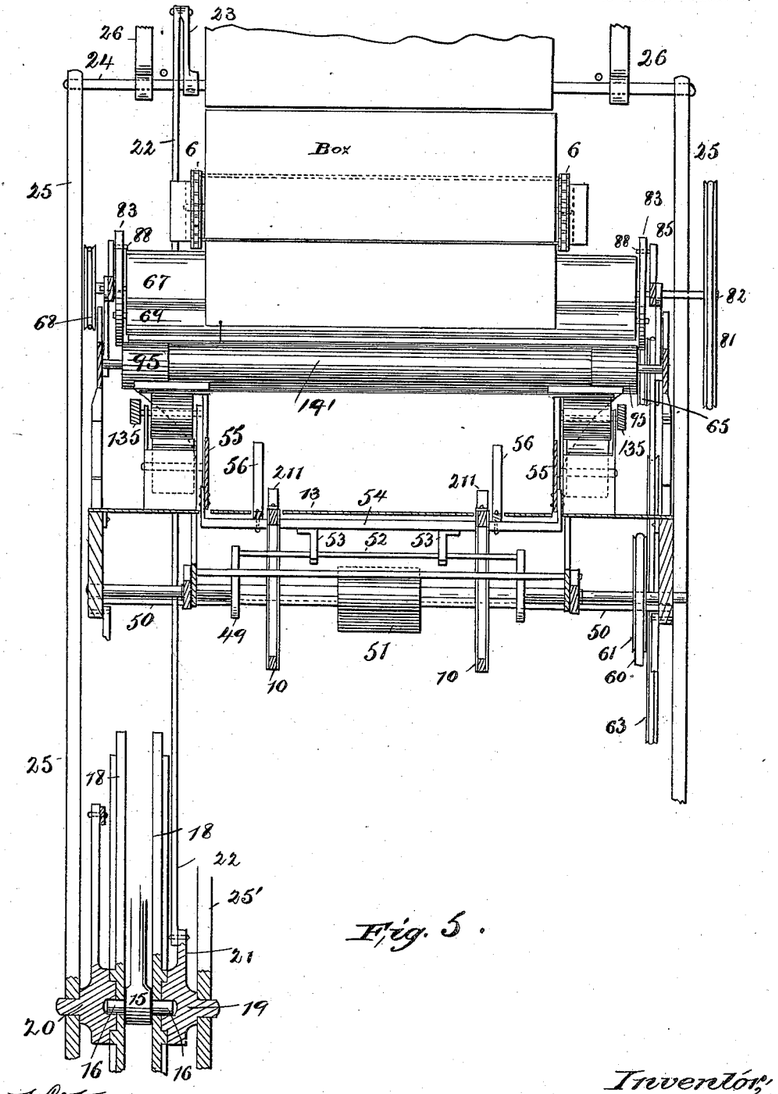
Fig. 5 is a vertical section on the line $x\ x$ in Fig. 3.
Figure 6:
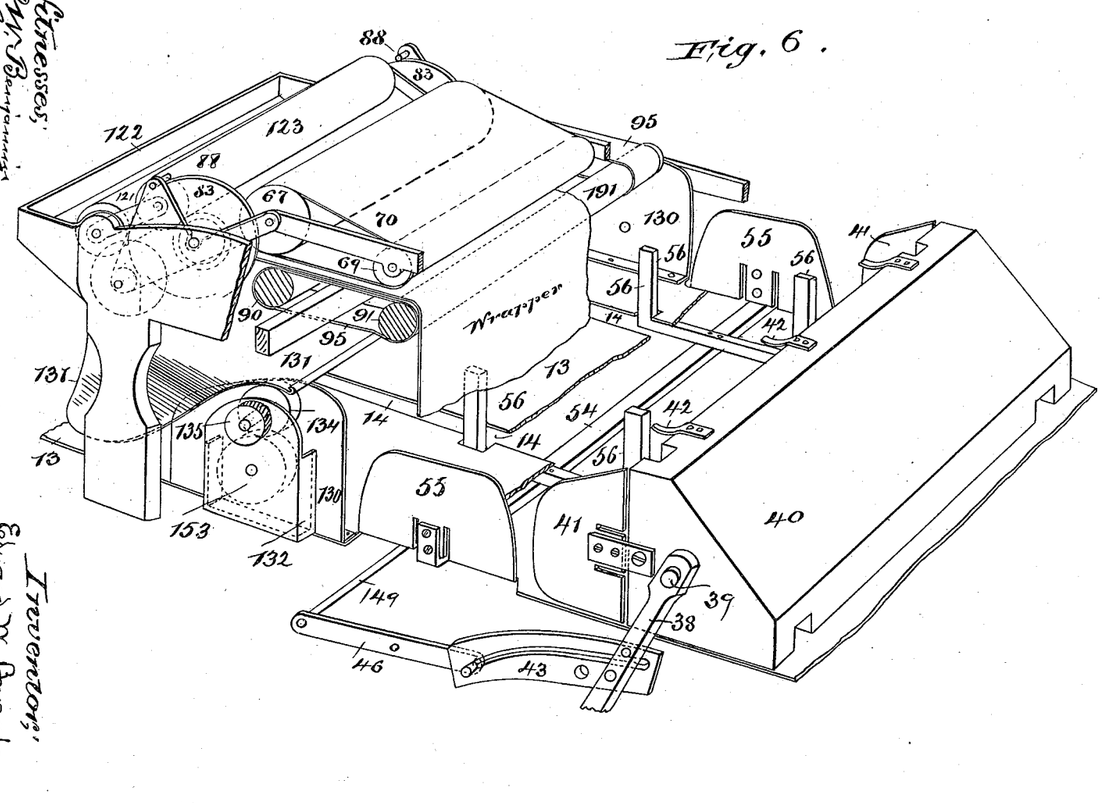
Fig. 6 is a perspective of a portion of the mechanism.

The mechanism for operating the vertical and horizontal reciprocating plungers is as follows: On the main shaft 1 is mounted a wheel 201, to which is pivotally secured an arm 15, which is traversed near its opposite extremity by a pin 16. The pin 16 is free to move in straight slots in fixed plates 18 18, through which it projects and enters oppositely-arranged curved slots in rock-bars 19 20, which rock-bars are centrally pivoted in uprights 25 25'. The connections of these rock-bars are as follows: To the rock-bar 19 is secured an arm 21, which by a connecting-rod 24 is connected with an arm 23, which is rigidly secured to a shaft 24, pivoted in the uprights 25 25. To the same shaft are also secured two arms 26 26, which are pivotally secured to a cross-bar 29, passing through uprights 27, on which is carried a plunger 28, under which the boxes are delivered by the feed-chains 6 6 and by which they are forced down to the level of the delivery plane or table 13. To the rock-bar 20 is secured an arm 33, connected by connecting-rod 34 with an arm 35, secured to a shaft 36, to which are also secured arms 38 38, pivotally secured to a rod 39, which passes through the push-block or horizontal plunger 40, on which are carried folding shares or wings 41 41 and fingers 42 42. The office of the push-block 40 is to push the box forward from the position in which it is placed by the plunger 28 until it is caught by the delivery-chains 11 11, and the folding-shares 41 41 form one of the folds made in the wrapper in the course of inclosing the box therein. On the arms 38 38 are carried plates 43 43, in which are curved slots 44 44. In the slots 44 44 ride pins 45 45, which are secured at one end of levers 46 46. The levers 46 are pivotally mounted at 47 and are connected with arms 49, mounted on a shaft 50. The free ends of the arms 49 are connected by a cross-bar 52, on which are supported, by means of uprights 53 53 and cross-bar 54, folding-shares 55 55, by which one of the folds in the box-inclosing wrapper is made, and uprights 56 56, which project up through openings in the delivery-table 13 and serve to hold the box in place while the first folds of the wrapper are being made. The details of this part of the mechanism are best shown in Figs. 5 and 6. Preferably the arms 49 are extended rearwardly beyond the point at which they are pivoted and are connected by a cross-bar on which is carried a counterweight 51.

From the foregoing it will be clear that the push-block 40, carrying the folding-shares 41 41, is moved forward and back and the folding-shares 55 55 and the uprights 56 56 are moved up and down by the movement of the rock-bar 20.

*The paper-feed mechanism.*—Between the box-feed plane or table 8 above and the delivery plane or table 13 below lies a paper-feed plane or table 100, upon which the wrappers for the boxes are fed into the machine. It is in two parts, being interrupted centrally by an opening or well through which the boxes pass on their way from the box-feed plane to the delivery-plane and across which the box-wrappers lie when they reach their position of rest after being fed into the machine.

Figure 1:
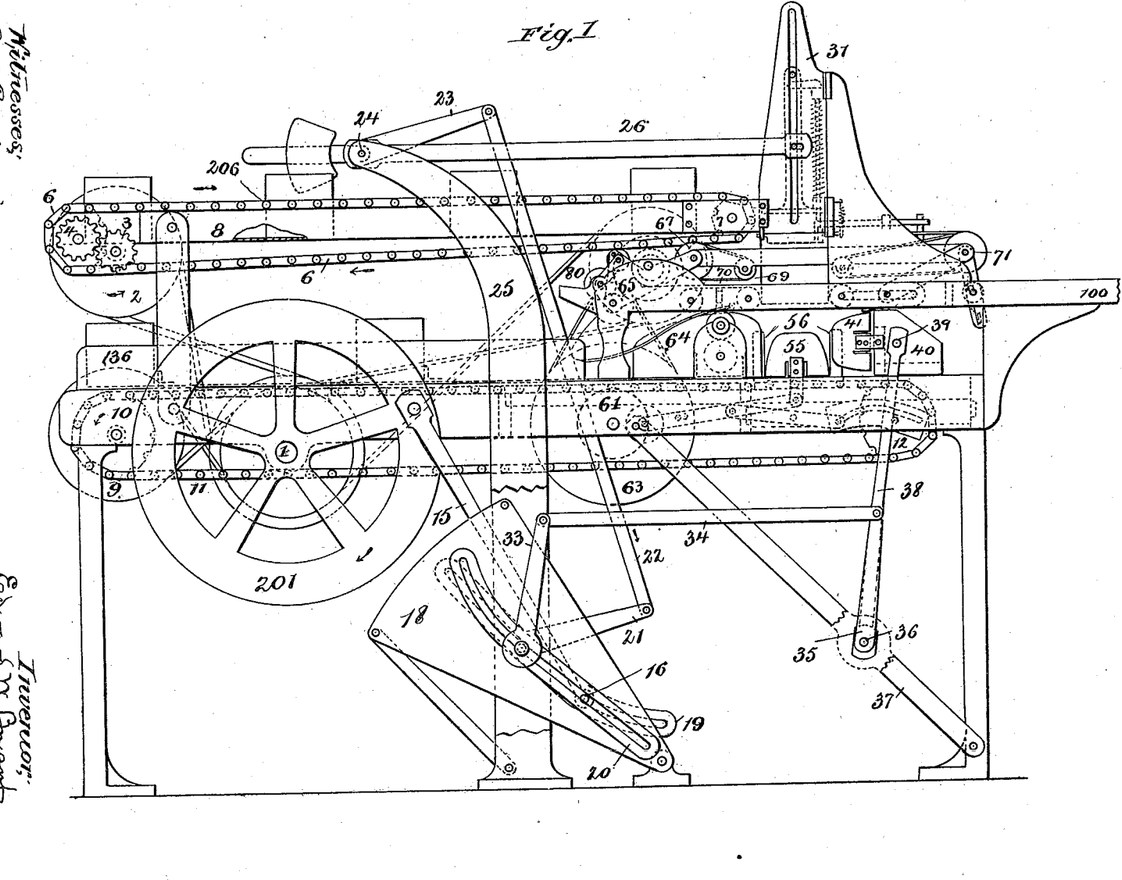
Figure 1 of the drawings shows a side elevation of the machine, and Fig. 2 a similar view of a portion thereof, on a larger scale.
Figure 2:
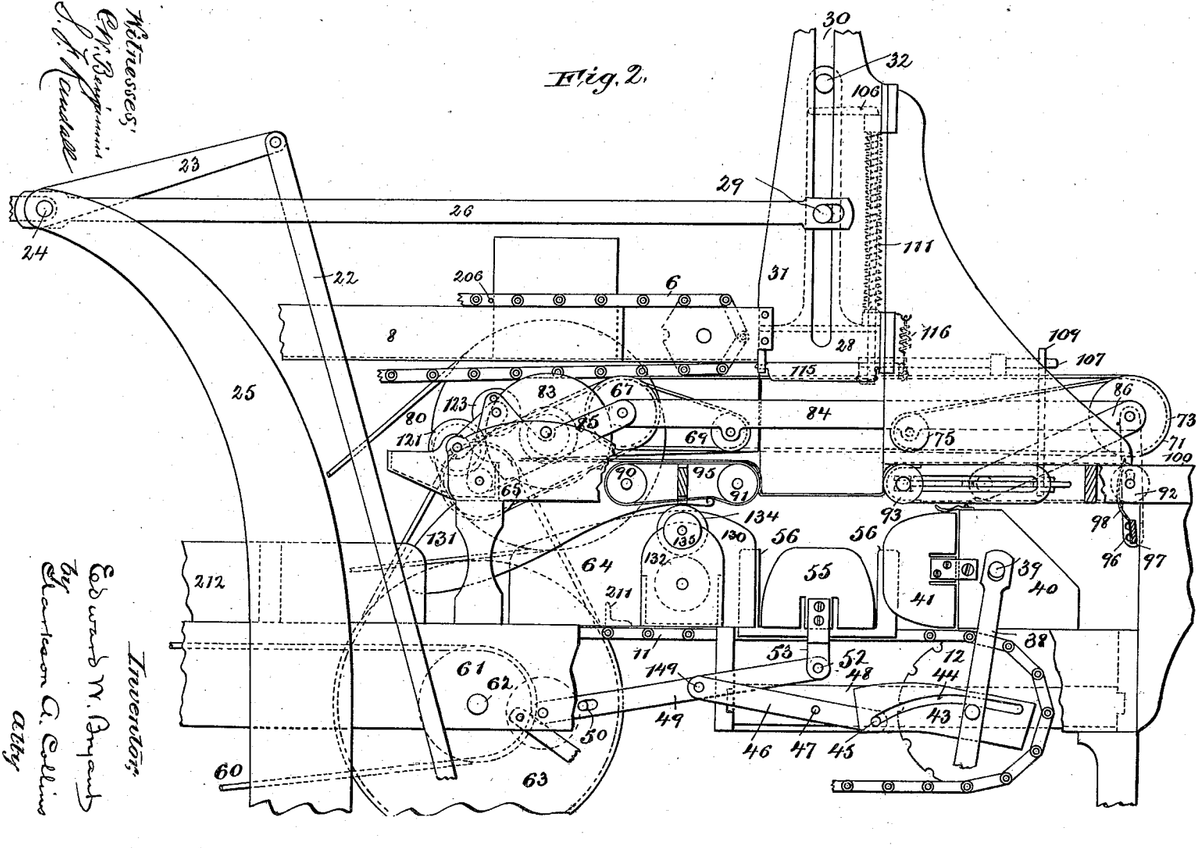
Figure 3:
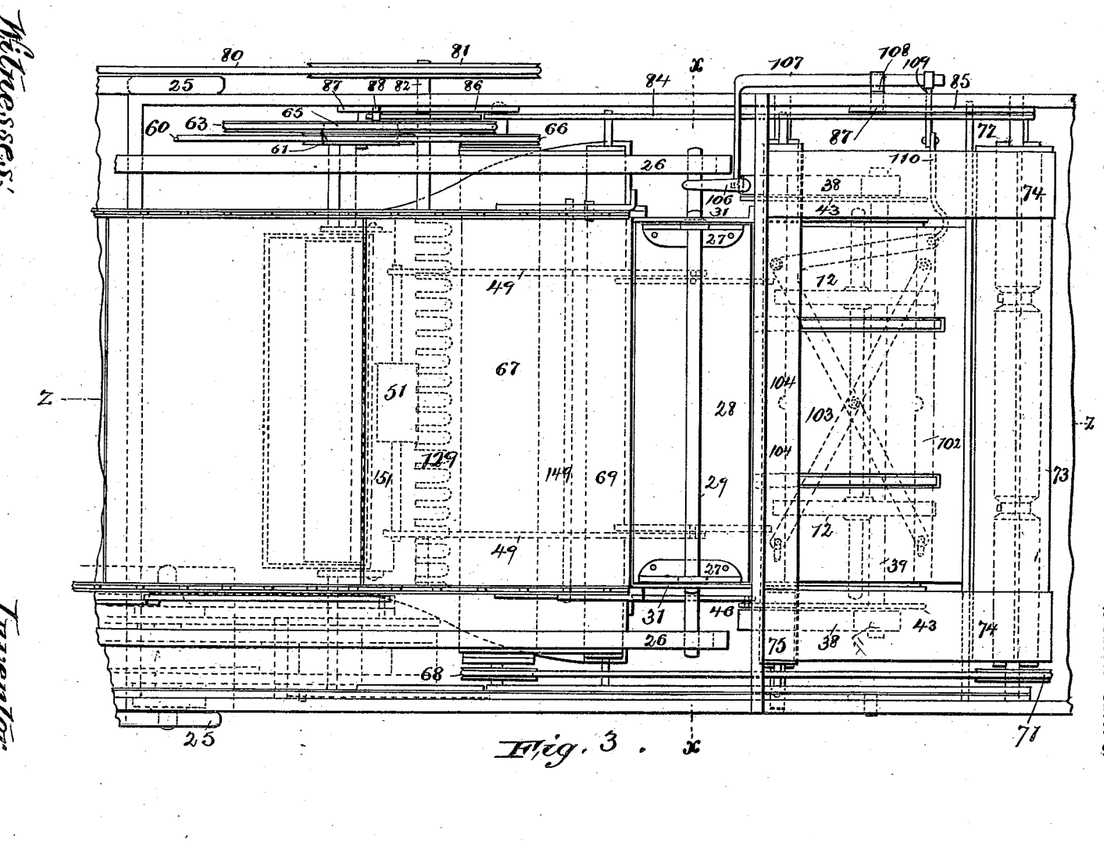
Fig. 3 is a plan view.
Figure 7:
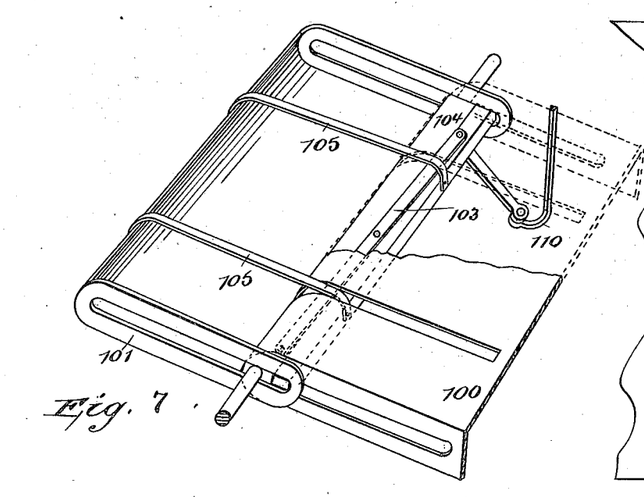
Fig. 7 shows a perspective, and Fig. 8 a plan view, of a portion of the mechanism, on an enlarged scale.
Figure 8:
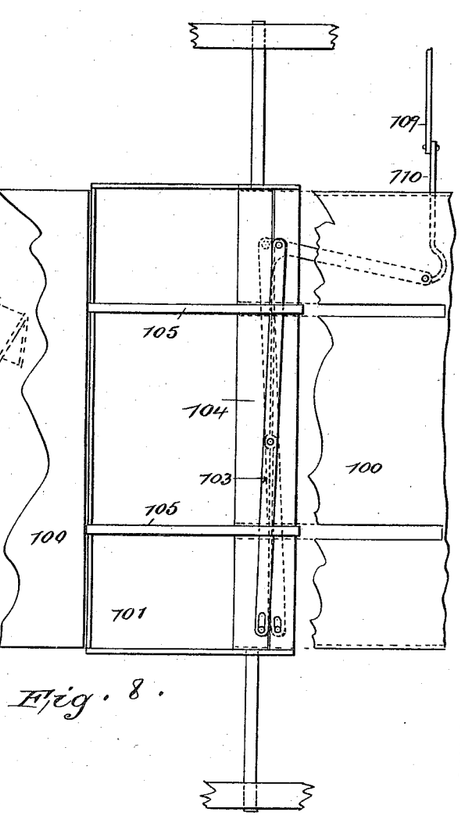

The mechanism for feeding into the machine the paper wrappers, which are cut of a suitable size and shape before being fed in, is as follows: In a swinging frame composed of side pieces 84 84 and end pieces 85 85 86 86, which end pieces are pivoted to the framework of the machine at 87 87, so that the whole forms a vertically-adjustable cradle, are pivoted two sets of rollers 67 69 and 73 75. In a rearward and upward extension of the end pieces 85 85 are set-pins 88 88, which rest upon the circumferences of wheels 83 83, a portion of which is cut away so as to form a cam, so that as the wheels 83 83 turn the cradle, carrying the rollers 67 69 73 75, will rise and fall. Around the rollers 67 69 passes a feed-band 70, of cloth or similar suitable material, which may extend the entire length of the rollers or be in the shape of two narrow bands at the ends thereof, and around the rollers 73 75 pass two similar feed-bands 74 74 of limited width and located at the ends of the rollers. Underneath the rollers 67 69 are mounted short rollers 90 90 91 91, around which pass feed-bands 95 95. A roller or sleeve 191, loosely mounted on the same shaft with and between the rollers 91 91, operates to form one of the folds of the wrapper, as hereinafter described. Also underneath the rollers 73 75 are rollers 92 93 93, around which pass similar feed-bands. These several rollers are so adjusted vertically that when the cradle carrying the rollers 67 69 73 75 is down and these rollers are at their lowest point the upper and lower feed-bands will be in contact and the paper wrappers will be gripped and fed in between them. To permit this, the lower feed-bands lie flush with or slightly above the upper surface of the paper-feed table 100, upon which the wrappers are fed into the machine. The series of paper-feed rollers are operated as follows: From a suitable pulley on the main shaft a belt 60 (see Figs. 2 and 3) passes around a pulley 61, mounted on a shaft 62, on which is also a belt-wheel 63, from which a belt passes around a double-grooved pulley 65. From the pulley 65 a belt passes around a pulley 66, mounted on the same shaft as and giving motion to the roller 67. Rollers 69 69 are rotated by the bands 70 from roller 67. The rollers 90 90 91 91 have no independent motion. From a pulley 68, mounted on the same shaft with roller 67, a belt passes around pulley 71 on shaft 72, on which is the roller 73. Roller 75 again is operated by the feed-bands from roller 73, and rollers 92 and 93 93 have no independent motion. The vertical motion of the cradle which carries the upper series of paper-feed rollers is effected by the pins 88 88, already referred to, which ride on the cam-wheels 83 83, mounted on axle 82, on which is a belt-wheel 81, from which a belt 80 passes around a pulley on the main shaft. The belt-wheel 81 and the belt wheel or pulley on the main shaft from which it is driven are of equal size, so that the cam-wheels 83 83 revolve once for each revolution of the main shaft. From the shaft 72 of the roller 73 depend two straps 96 96, which are slotted to embrace the shaft of roller 93. On these straps is carried a cross-piece 97, to which are secured two upwardly-projecting pins 98 98, which lie in slots in the roller 92, (shown in Fig. 3,) and when the cradle carrying the upper band-wheels is lifted project through the paper-feed table 100 and serve as stops to regulate the forward feed of the paper into the machine. In order to provide for the passage of the fed-in sheets of paper across the well underneath the plunger 28, I provide a tray-shaped bridging device or slider 101 (shown in detail in Figs. 7 and 8) of sheet metal, the front of which is curved upward and carries fingers 105, which when the slider 101 is in its position of rest lie in slots in and flush with the surface of the paper-feed table 100. The sides of the slider 101 are turned up and lie outside of the turned-down sides of the paper-feed table. The rear of the slider 101 is secured to a cross-piece 102, which is fastened to shears 103, the front ends of the members of which are pivoted to a fixed cross-piece 104, (the ends of which also serve as axles for the band-wheels 93 93.) An arm 106, adapted to be struck and raised by the cross-bar 29 of the plunger 28 in its upward motion, is connected with an arm 107, which is bent to form a crank and passes through a socket or sleeve 108. The arm 107 is joined to the pivotally-connected arms 109 110, the latter of which is attached to the shears 103. When the arm 106 is lifted, the arm 107 is rotated and the arms 109 110 are pulled outward, so that the shears are closed, the cross-bar 102, carrying the slider 101, is moved forward, and the fingers 105, together with the upturned sides of the slider, extend across the well under the plunger and form a bridge on which the paper is carried across. A spring 111, secured to the arm 106, serves when the arm is free to descend to draw it down, thereby opening the shears 103 and retracting the slider and the fingers carried thereby. The lower edge of the upcurved front of the slider 101 also operates when the slider is moved forward to form one of the folds in the paper wrapper, as will be more fully hereinafter explained.

Figure 4:
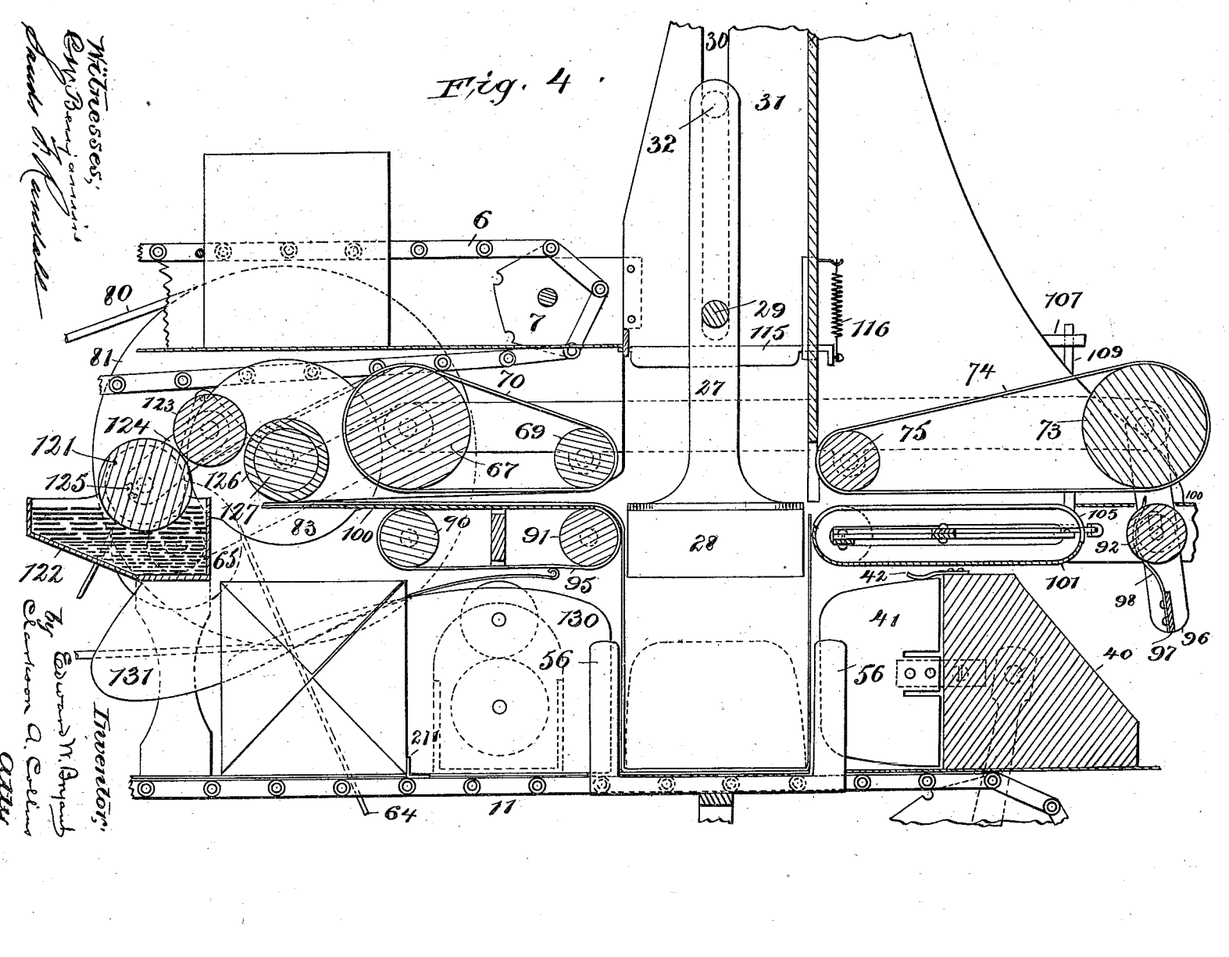
Fig. 4 is a longitudinal section on the line $z\ z$ in Fig. 3.

*The pasting apparatus.*—A friction-pulley 120, mounted on the axle of wheel 65, (see Fig. 4,) makes operative contact with a friction-pulley 121ª on the axle of the paste-feed roller 121, which dips in the paste-tank 122. The paste-feed roller 121 delivers paste to and by friction rotates a second roller 123, which I call the "paste-distributing" roller, which is mounted on an axle pivoted in straps 124 124, which are pivotally mounted on the axle of the paste-feed roller 121. Free movement of these straps on the axle, and consequently the range of movement of the roller 123, is limited by pins 128 128, set in the ends of the paste-tank 122, which engage notches 125 125, cut in the ends of the straps. The roller 123 makes contact with the paste-applying roller 126, which consists of an exterior sleeve 126, which surrounds and is free to revolve upon a cylindrical core 127, which is eccentrically mounted upon and rigidly secured to the shaft of the cam-wheels 83 83. The sleeve 126 receives paste from the paste-distributing roller 123 and applies it to the edge of the paper wrapper at the rear of the paper-feed table, which is cut away in comb shape, as shown at 129, Fig. 3, so as to reduce to a minimum the table-surface upon which paste may become accidentally smeared. The eccentricity of the core 127 of the paste-applying roller 126, together with the limitation of the swing of the distributing-roller 123 by the engagement of the pins 128 128 in the notches 125 125, limits the contact of the roller 123 with the sleeve 126 to a part only of the revolution of the latter, so that the sleeve 126 is left free to make a rolling contact with the paper in applying paste thereto, this manner of contact being provided for by the free movement of the sleeve 126 on its core 127, so as to prevent dragging and pulling of the paper. A second paste-tank 132 supplies paste to feed-rollers 133 134, by which paste is applied to the final fold of the wrapper over the end of the box.

Figures 9, 10, 11, 12, 13, 14:
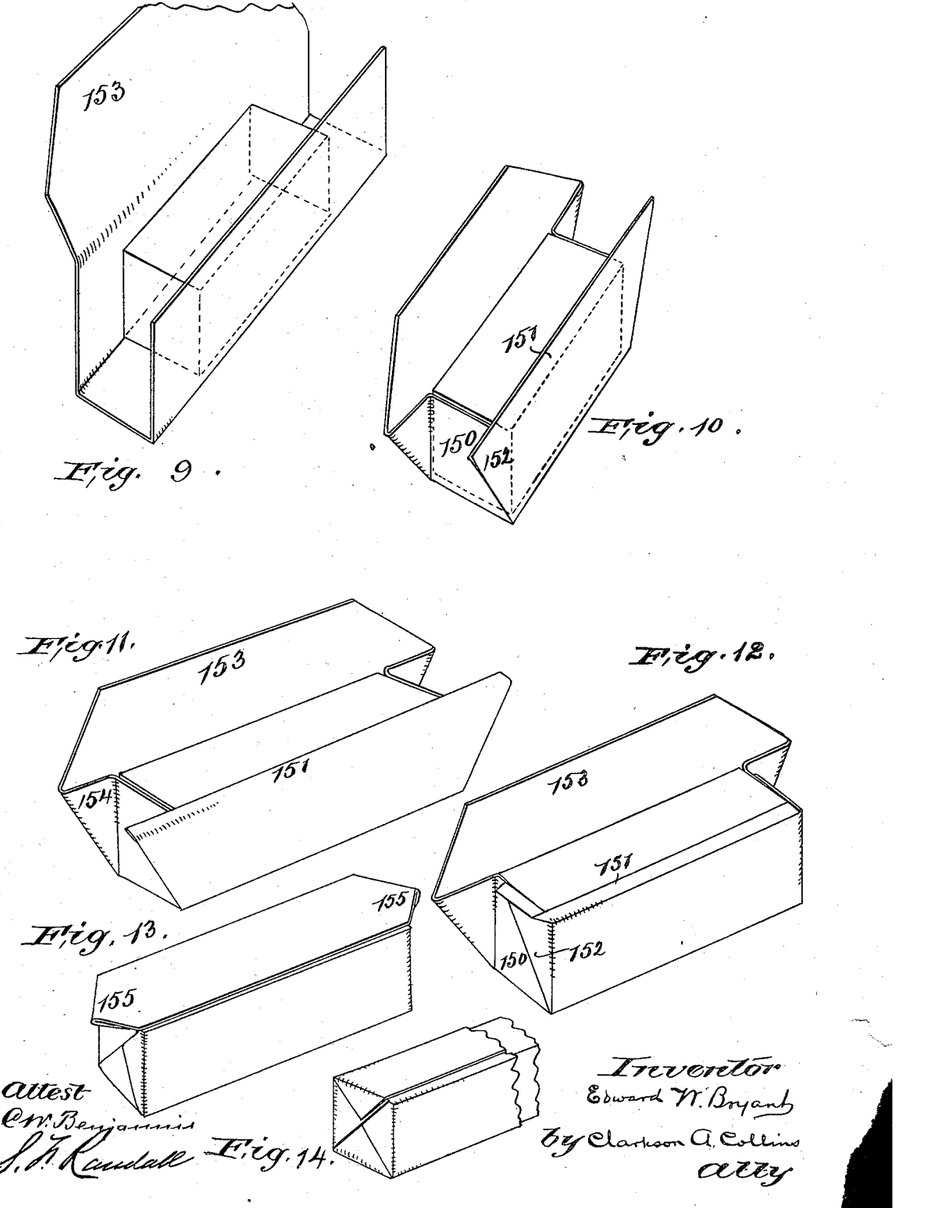
Figs. 9, 10, 11, 12, 13, and 14 show the positions successively assumed by the wrapper as it is acted on by the different parts of the mechanism.
Figure 15:
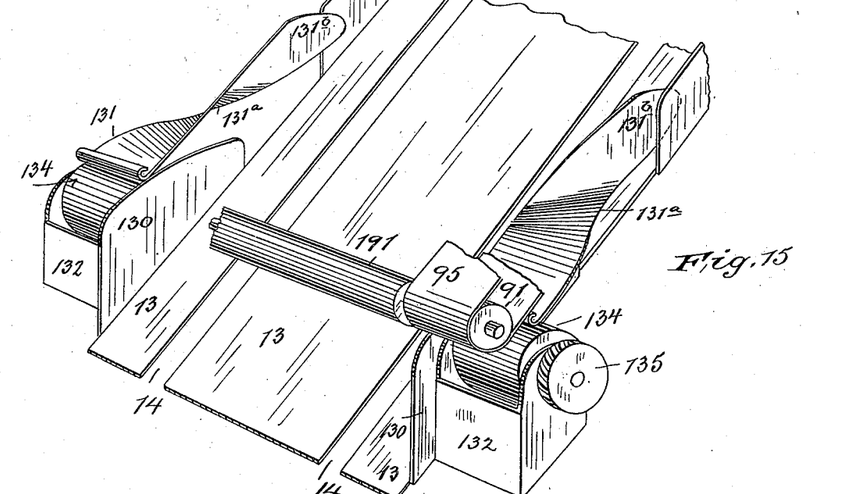
Fig. 15 shows a perspective, Fig. 16 a plan, Fig. 17 a side view, and Fig. 18 an end elevation, of the folding-shares for making the final fold in the box-wrapper.
Figures 16, 17, 18:
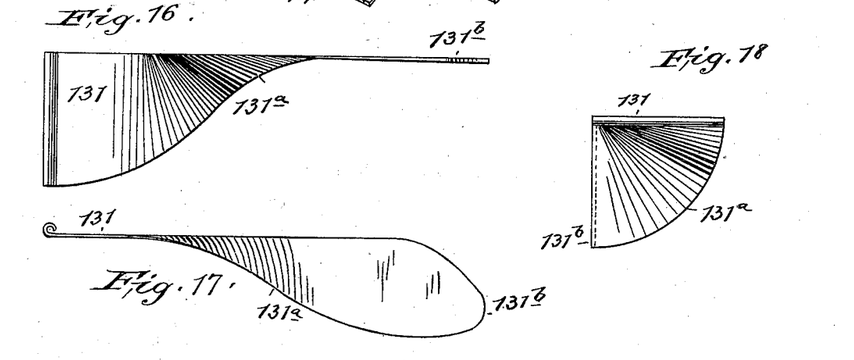
Figure 19:
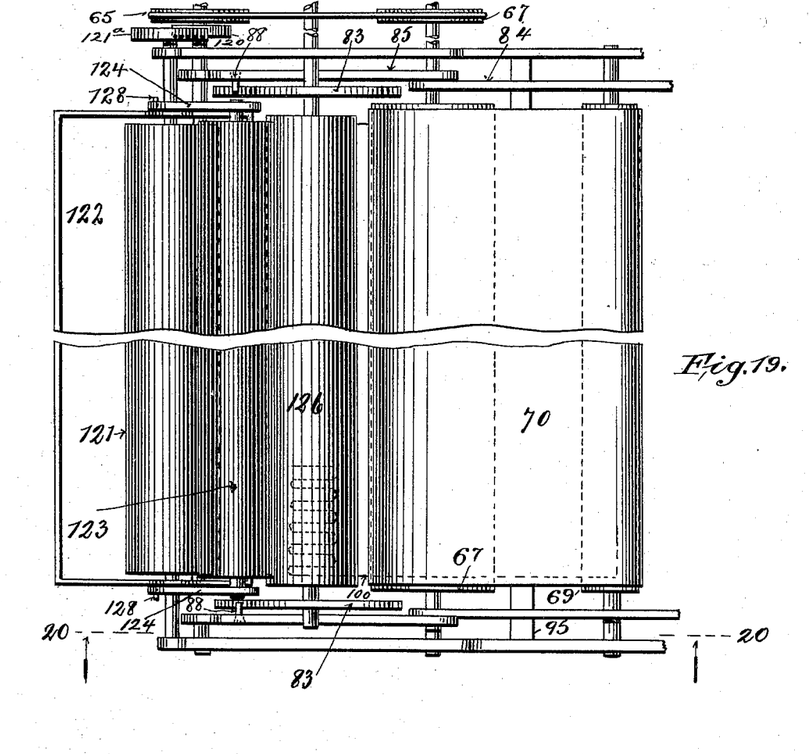
Figs. 19 and 20 are special views of the pasting mechanism, on an enlarged scale.
Figure 20:
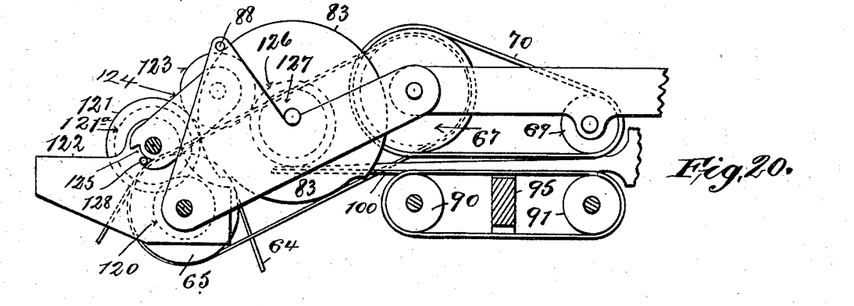

The operation of the machine is as follows: The boxes to be wrapped are delivered in any suitable manner upon the feed-table 8, along which they are pushed by the equidistant cross-bars 206, connecting the feed-chains 6 6, through the movement of the chains until they rest upon the pivoted supports 115 115, upheld by the springs 116 116. When a box has received its final impulse from the feed-chains, it rests upon the supports 115 115, directly under the plunger 28, which is at the highest point of its stroke at the instant the box is delivered into this position, ready to force it down the plunger-well to the delivery-table 13. Assuming that a box is in this position, the operation of the several parts of the machine as it passes therethrough will be as follows: The plunger at this time being at its highest point, the arm 106 is lifted and the shears 103, operated thereby, are closed, so that the bridge-slider 101 is at the extreme point of its forward movement, and the plunger-well is bridged by the fingers 105 and the upturned edges of the slider. The rock-bars 19 20 are both at their center of rest. With the revolution of the cam-wheels 83 83 the cradle 84 85 86, carrying the upper set of paper-feed rollers, descends, and the guide-fingers 98 98, against which a wrapper has been adjusted, drop below the paper-feed table. The wrapper is seized between the upper and lower feed-rollers 71 92 and is carried by and between the feed-bands 74 74 99 99, along the paper-feed table, across the plunger-well, and between the feed-bands 70 and 95 until its forward edge is over the serrated rear edge of the feed-table 129. Paste is applied to the edge of the wrapper by the revolution of the paste-roller 126, and the upper feed-rollers are lifted by the revolution of the cam-wheels 83 83. As the pin 16 enters the curved portion of the slot in the rock-bar 19 the arm 21 is drawn down, and through the connecting-rod 22 and the arms 23 and 26 forces down the plunger 28. The motion of the plunger is kept vertical by guide-pins 32 32, attached to the uprights 27 27 and working in the slots 30 30 in the plates 31 31. As the plunger begins to descend the arm 106 is released and is drawn down by the spring 111, thereby opening the shears 103 and retracting the bridge-slider 101, so that the plunger-well is left open, except for the wrapper lying across it. The box is forced down the well by the plunger to the delivery-table 13, carrying with it the wrapper, which is folded up on the sides of the box by the sides of the plunger-well and is caused to take the position shown in Fig. 9. As the box descends the projecting ends of the wrapper come against the folding-shares 55 55 and are turned in, making the end folds 150 150, as shown in Fig. 10. As the plunger 28 rises the arm 106 is struck and lifted by the cross-bar 29, thereby closing the shears 103 and bringing forward the bridge-slider 101 to bridge the plunger-well for the passage of the next following wrapper, and the upstanding edge 151 of the wrapper is turned down by the lower rounded edge of the bridge-slider, giving to the wrapper the form shown in Fig. 11. At the same time the rock-bar 20, working alternately with the rock-bar 19, has begun to pull over the arms 33 35 38, thereby bringing forward the push-block 40, carrying the folding-shares 41 41, which turn in the outstanding ends 152 of the wrapper, giving it the shape shown in Fig. 12. As the push-block 40 moves forward the folding-shares 55 55 and the uprights 56 56, which hold the box in place while the fold 152 is being made, descend through the action of the pin 45 in the curved slot 44 and the levers 46 and 49 until when the fold 152 is completed the folding-shares 55 55 and the uprights 56 56 fall below the delivery-table 13 and the box is free to move forward, impelled by the push-block 40, which continues to advance until the box is caught by the pawls 211 on the delivery-chain 11. As the push-block 40 reaches the box the fingers 42 42 on the push-block slip over the edge of the box underneath the bridge-slider 101, which is at the moment in its forward position, and serve to hold down the fold 151 until it is caught by the opposite edge of the wrapper, which is folded down upon and pasted to it. This edge 153, to which paste has already been applied by the pasting-roller 126, is turned down and pasted to the fold 151 by the passage of the box as it is moved forward under the roller 191. (Not heretofore described.) This roller, composed of brass or similar suitable material, is mounted and revolves freely upon the same fixed shaft the ends of which carry the paper-feed rollers 91 91, between which roller 191 lies. Its diameter is somewhat greater than that of the rollers 91 91, and its length is the same as that of the box to be wrapped. As the box passes under the roller 191 it is at the same time carried between and its ends press closely against two vertical folding-shares 130 130, (see Fig. 15,) which are secured to and closely adjoin the edges of the discharge-table 13, by contact with which the end folds 154 154, Fig. 11, are turned in, so that by the turning in of the end folds 154 and the coincident turning down of the flap 153, Fig. 12, by the passage of the box under the roller 191 the wrapper is given the shape shown in Fig. 13.

The final folds 155 155 of the wrapper are turned down by means of the folding-shares 131 131. (See Fig. 15 and following figures.) These are plates of metal which at the end first approached by the box are horizontal and from this point are twisted, turning downward and inward toward the discharge-table until the other end $131^b$ is vertical. Their shape, resembling that of a plowshare, is not easy to describe, but can be readily understood by reference to Figs. 15, 16, 17, and 18 of the drawings.

As the folds 155 155 of the wrapper pass under the horizontal part of the shares 131 131 they are thereby pressed against the pasting-rollers 134 134, (see Fig. 6,) which are supplied with paste from the rollers 133 133, set in the paste-tanks 132 132. The first application of paste to the pasting-roller 134 134 is secured by revolving them by the thumb-pieces 135 135, after which the paste-feed is automatic, as the rollers are revolved by the friction of the wrapper passing over them. The folds 155 155 are then turned downward and inward, following the curving surfaces of the shares 131 131 as the box passes along until at the point $131^b$ they are pressed firmly against the ends of the box and the folding of the wrapper into the shape shown in Fig. 14 is completed. As the box passes along and out of the machine the folding ends of the wrapper are held firmly in place by upstanding sides 212 (see Fig. 2) of the delivery-table, between which the box closely fits, so that the complete adhesion of the pasted folds is secured before the box is ejected from the machine.

From the foregoing it will be evident that by means of my invention rectangular boxes, such as cracker or other boxes, may be automatically inclosed in sealed wrappers with great speed, it being only necessary to feed into the machine the boxes and wrappers of suitable size and shape. I have not illustrated in the drawings the pulleys on the main shaft by which motion is given to different parts of the machine, as there is nothing peculiar about these, it being only necessary that they shall be of such sizes that the speeds of the several parts of the machine shall be properly coördinated, as will be well understood by those skilled in the art. Indeed, I may, if desired, dispense with pulleys and belts entirely or in part and use gear-wheels or other suitable mechanism for transmitting power from the main shaft to the moving parts of the machine without departing from the nature of my invention.

What I claim as new, and desire to secure by Letters Patent, is—

1. In a box-wrapping machine the combination of a paper-feed plane having an opening therein, a vertically-moving plunger working through said opening and means for bridging said opening consisting of shears arranged to be opened by the upward movement of said plunger and a bridging device carried on said shears and arranged to be carried across the opening in the paper-feed plane by the opening movement of the shears, substantially as and for the purposes set forth.

2. In a box-wrapping machine the combination of a paper-feed plane having an opening therein and means for bridging such opening to permit the passage of the wrappers thereacross, such means consisting of shears, a sliding device carried by said shears, bridging fingers carried by said device and means for opening and closing said shears, substantially as and for the purposes set forth.

3. In a box-wrapping machine having a paper-feed plane with an opening therein, the combination of shears, 103, pivotally attached to a fixed support, means for opening and closing said shears and a device carried by said shears and arranged to be carried forward by the closing movement thereof and operating in its forward movement to turn down a fold of the box-wrapper and bridge the opening in the paper-feed plane, substantially as and for the purposes set forth.

4. In a box-wrapping machine the combination of a paper-feed plane having an opening therein, means for intermittently bridging said opening, upper and lower paper-feed rollers and bands, and means for raising and lowering said upper rollers, substantially as and for the purposes set forth.

5. In a box-wrapping machine the combination with a paper-feed plane of a set of paper-feed rollers and bands fixed in position in relation thereto and a set of upper feed rollers and bands superimposed thereon and set in a vertically-movable cradle and means for raising and lowering said cradle, substantially as and for the purposes set forth.

6. In a box-wrapping machine the combination of a vertically-movable cradle carrying a set of feed-rollers, means for raising and lowering the same, a paper-feed table and detents arranged to be moved vertically by the movements of said cradle and, when lifted, to project above said table, substantially as and for the purposes set forth.

7. The combination of the rock-bars, 19, 20, having the oppositely-arranged curved slots therein, the fixed plates, 18, 18, having straight slots therein and the pin, 16, carried by the arm, 15, and engaging the said several slots, and feeding and folding mechanism adapted to be operated by the movement of the said rock-bars, substantially as and for the purposes set forth.

8. In a box-wrapping machine the combination of the rock-bars, 19, 20, means for alternately moving said rock-bars, a vertically-moving plunger adapted to be operated by the movement of one of said rock-bars and a horizontally-moving plunger or push-block arranged to be operated by the movement of the other of said rock-bars, and delivery-chains into engagement with which the box is brought by the forward movement of said push-block, substantially as and for the purposes set forth.

9. In a box-wrapping machine the combination of a horizontally-moving plunger or push-block, means for imparting motion thereto, folding-shares carried thereby, vertically-movable folding-shares and box-holding uprights and means, arranged to be operated by the forward-and-back movement of the push-block, for moving said vertically-movable folding-shares, and box-holding uprights, substantially as and for the purposes set forth.

10. In a box-wrapping machine the combination of a horizontally-moving plunger or push-block, means for imparting motion thereto, vertically-movable folding-shares and box-holding uprights and means, arranged to be operated by the forward-and-back movement of the push-block for moving said folding-shares and uprights, substantially as and for the purposes set forth.

11. In a box-wrapping machine the combination of a horizontally-moving plunger or push-block, means for imparting motion thereto, vertically-movable folding-shares and means, arranged to be actuated by the movements of the push-block, for raising and lowering said folding-shares, substantially as and for the purposes set forth.

12. In a box-wrapping machine the combination of a horizontally-moving plunger or push-block, means for imparting motion thereto, vertically-movable uprights arranged when in their elevated position to receive and hold a box in position on a delivery-plane and means actuated by the movements of said push-block for raising and lowering said uprights.

13. In a box-wrapping machine the combination of a paste-tank, a paste-feed roller dipping therein, a paste-distributing roller, in contact with said paste-feed roller, and an eccentrically-mounted paste-applying roller arranged to rotate freely upon its support and to make intermittent contact with said paste-distributing roller, substantially as and for the purposes set forth.

14. In a box-wrapping machine the combination of a paste-distributing roller mounted in pivoted supports, means for limiting the range of movement of said supports and an eccentrically-mounted paste-applying roller arranged to rotate freely upon its support and to make intermittent contact with said paste-distributing roller, substantially as and for the purposes set forth.

15. In a box-wrapping machine a paste-applying roller, consisting of a cylindrical, eccentrically-mounted core and a sleeve surrounding said core and free to rotate thereon, substantially as and for the purposes set forth.

16. In a box-wrapping machine the combination of a paste-applying roller comprising an eccentrically-mounted core and a sleeve free to rotate thereon and means for positively rotating said core substantially as and for the purposes set forth.

17. In a box-wrapping machine the combination of a vertically-moving plunger, a paper-feed plane having an opening therein, a discharge-table located below the paper-feed plane and constituting a box-support and means, arranged to be operated by the movements of said plunger for intermittently bridging said opening and at the same time turning down a fold of the box-wrapper substantially as and for the purposes set forth.

18. In a box-wrapping machine the combination of a paper-feed plane having an opening therein, a discharge-table located below the paper-feed plane and constituting a box-support and means arranged to intermittently bridge said opening and at the same time turn down a fold of the box-wrapper, substantially as and for the purposes set forth.

In testimony whereof I have hereunto subscribed my name this 18th day of April, A. D. 1900.

EDWARD W. BRYANT.

Witnesses:
CLARKSON A. COLLINS,
SANDS F. RANDALL.